United States Patent
Schwiers et al.

(10) Patent No.: US 9,405,948 B2
(45) Date of Patent: Aug. 2, 2016

(54) METHOD FOR MONITORING THE FUNCTIONING OF AN RFID-BASED RADIO COMMUNICATION NETWORK IN A SPATIALLY EXTENSIVE AREA

(71) Applicant: IDENTEC Solutions AG, Lustenau (AT)

(72) Inventors: Stefan Schwiers, Dubai (AE); Frank Wehus, Kristiansand (NO)

(73) Assignee: IDENTEC SOLUTIONS AG, Lustenau (AT)

( * ) Notice: Subject to any disclaimer, the term of this patent is extended or adjusted under 35 U.S.C. 154(b) by 254 days.

(21) Appl. No.: 14/028,081

(22) Filed: Sep. 16, 2013

(65) Prior Publication Data

US 2014/0077934 A1    Mar. 20, 2014

(30) Foreign Application Priority Data

Sep. 15, 2012 (EP) .................................. 12006492

(51) Int. Cl.
  *G06K 7/10* (2006.01)
  *G08B 21/22* (2006.01)
  *G08B 29/02* (2006.01)

(52) U.S. Cl.
  CPC ............ *G06K 7/10366* (2013.01); *G08B 21/22* (2013.01); *G08B 29/02* (2013.01)

(58) Field of Classification Search
  CPC ..... G08B 21/22; G08B 29/02; G06K 7/10366
  USPC .................................... 340/10.4, 10.1, 572.1
  See application file for complete search history.

(56) References Cited

U.S. PATENT DOCUMENTS

| 5,745,037 | A  | * | 4/1998 | Guthrie ................. | G08B 29/18 340/10.2 |
| 6,380,894 | B1 |   | 4/2002 | Boyd | |
| 2006/0012476 | A1 | * | 1/2006 | Markhovsky .......... | G01S 13/74 340/539.32 |
| 2007/0188328 | A1 | * | 8/2007 | Mochizuki .......... | G06K 7/0008 340/572.7 |
| 2008/0030359 | A1 | * | 2/2008 | Smith ................... | G01S 13/767 340/686.1 |

FOREIGN PATENT DOCUMENTS

| WO | 9748081 A1 | 12/1997 |
| WO | 2007145890 A2 | 12/2007 |

* cited by examiner

*Primary Examiner* — Edwin Holloway, III
(74) *Attorney, Agent, or Firm* — Browdy and Neimark, PLLC

(57) ABSTRACT

A method for monitoring the functioning of an RFID-based radio communication network in a spatially extensive area, wherein a plurality of RFID tags carry out a radio communication with a reader, wherein in the area of coverage of the RFID system at least one fixed reference RFID tag is arranged that carries out a periodic radio communication with a reader and the data from which is compared in a control center with previously transmitted data.

9 Claims, 2 Drawing Sheets

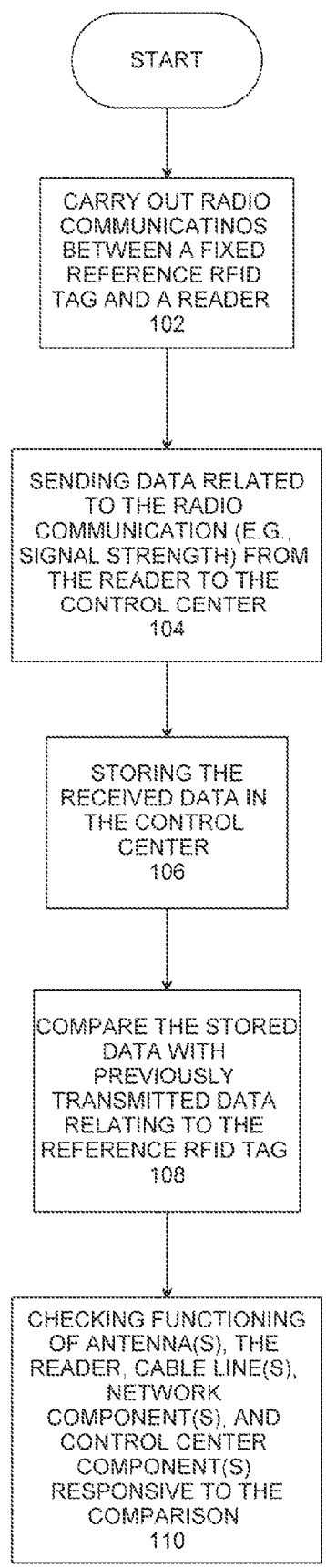

METHOD FOR MONITORING THE FUNCTIONING OF AN RFID-BASED RADIO COMMUNICATION NETWORK IN A SPATIALLY EXTENSIVE AREA

FIELD

A method for monitoring the functioning of an RFID-based radio communication network in a spatially extensive area.

BACKGROUND

The prior art consists of an RFID-based radio communication system comprising a plurality of RFID tags that are in radio communication contact with one or more readers. By means of this radio communication, the RFID tags transmit their ID codes and further data to a stationary reader.

An RFID system of this type is employed, for example, for monitoring the presence of workers on oil platforms, in spatially extensive industrial areas, or in container terminals, each container in the latter case being equipped with a tag bearing a unique identifier. In the case of this RFID system, the type and placement of the containers in the spatially extensive area is captured.

On oil platforms, it is necessary to continually monitor the presence of the workers employed there. Each employee therefore carries with him an RFID tag bearing his individual identification. The radio communication between the plurality of tags and the one or more stationary readers permits reliable detection of the presence and the whereabouts of the worker.

It is a shortcoming of the prior art that it is not always possible to ensure that each tag is in operationally reliable and functioning radio communication with the reader. For example, it can happen that an RFID system terminates its radio communication with the tag because of a defect occurring in the system, or that it no longer communicates with the tag for other reasons. An unwanted false alarm is then triggered which, however, arises only from the termination of the radio communication but does not signify an accident of the worker wearing the tag on the oil platform.

Until now, it has been known only to limit the monitoring to a few components of this RFID system, for example to the functioning of RFID readers, or of individual components that work together with the RFID reader.

It is a shortcoming of the known systems, however, that it has been possible only to selectively check certain components of the RFID system for proper functioning. However, so far it has not been known to check the functioning of the entire RFID system and to ensure the performance thereof.

SUMMARY

The aim of the invention is therefore to prevent false alarms in monitoring the radio communication.

The invention is therefore directed to continually monitoring the functioning of a spatially extensive RFID system in order to determine whether the system itself has failed and radio communication with the individual tags is no longer possible, or whether only one or some of the tags have failed or are no longer reachable.

The invention therefore proceeds from a spatially extended RFID system in which the problem to be addressed is that of being able to continually check the functioning of the entire wireless and wired infrastructure.

The invention therefore provides a method and a system for ensuring the functioning of a complete RFID system.

To achieve this aim, the invention relates to a method for monitoring the functioning of an RFID-based radio communication network in a spatially extensive area, wherein a plurality of RFID tags (15) carry out a radio communication (5, 16) with a reader (6), in which in the area of coverage of the RFID system at least one fixed reference RFID tag (4) is arranged that carries out a periodic radio communication (5) with a reader (6) and the data from which is compared in a control center (13) with previously transmitted data.

An RFID system according to the present invention comprises at least one RFID reader, the associated radio components, the tags that are arranged spread out locally over a wide area which can be stationary and/or mobile and are activated by the reader, and the antenna array provided upstream of the RFID reader. Additionally the RFID system comprises the data lines from the receiving antenna to the control center, and the data capture and interpretation equipment arranged there.

It is an essential feature of the invention that a so-called fixed reference RFID tag is arranged within the area of coverage of the RFID system, which means that it is fixed at a specific location of the RFID field and only has the task of establishing periodic communication with the reader and transmitting according to the periodically established communication to the system being monitored a message that it has established the required radio communication with the reader and, hence, the entire system is working. The reference RFID tag according to the invention monitors the health, so to speak, of the entire RFID system, namely not only the wireless components but also the wired components.

The message that is transmitted by the reference RFID tag to the control center therefore contains at least the following components:

1. The ID of the reference tag;
2. The time of the radio communication;
3. Optionally the field strength (I-Mark signal) of a marker field;
4. Optionally the field strength of the tag signal (detected by the reader); and
5. Optionally the residual life of the battery used.

The location where the stationary reference RFID tag is located is known to the control center. This location has been stored for the respective reference RFID tag, with its location coordinates, in the control center, so the control center in addition to the interpretation of the unique identifier always knows with which reference RFID tag at what location it is currently communicating.

What is important is the indirect monitoring of the received field strength of the reference RFID tag. The reason for this is that the control center during each radio communication with the reference RFID tag stores the field strength it receives (from the reader) and compares the currently received field strength with previously received values. If there is a drop in the currently received field strength this means that there is a disruption in the communication with the reference RFID tag. This does not necessarily mean that there merely is a disruption in the radio communication. It may also be that a disruption (for example an unwanted attenuation) exists in the line cables or network components via which the signals and data are transmitted from the reader to the control center. The control center will therefore initiate further diagnostic steps in order to resolve the disruption detected via a drop in the received field strength of the reference RFID tag.

In a preferred embodiment the reference RFID tag is operated in a power saving mode, which brings with it the advantage of a particular longevity of the built-in battery. For the tags that are usually used in the RFID field the battery must be replaced after a period of a few weeks.

The reference RFID tag according to the invention, however, is kept permanently in a power saving mode, and the power saving mode is changed to an operating mode only in order to establish the brief information contact with the control center. As a result, the battery of the RFID tag lasts up to several years.

It is also preferred that the RFID tag is equipped to be explosion proof.

In the control center that monitors the reference RFID tag, an application is started that establishes at regular intervals the radio communication with the reference RFID tag, interprets the data received via the reader, and according to this data provides a diagnosis regarding the health of the entire system.

In an improvement of the present invention it is additionally provided that a so-called marker is monitored. Such a marker is a marking device that generates a spatially delimited electromagnetic field in a specific geographically delimited area of the RFID field. This allows further information about the functionality of the marker field to be obtained by interrogating the reference RFID tag.

With the aid of such a marker a geographically narrowly delimited electromagnetic field is thus created in the RFID system, and the marker sends a characteristic I-Mark signal to all of the RFID tags that are located in this marker field. The reference RFID tag located in this field thus sends to the reader an additional piece of information that includes that it is located in the marker field. It is also possible, of course, to send information that the RFID tag has just left the marker field or that it is located outside the marker field. An absence of or reception of a weak I-Mark signal provides a diagnosis about the quality or the functional state of the marker field.

The marker thus generates an additional local component or space component, the RFID tags located in this space component providing an additional piece of information to the reader.

It is an essential feature of the invention that the presence of the marker field is monitored as well by means of the reference tag according to the invention by ensuring that the reference RFID tag according to the invention is placed in the marker field. This is used to check that the reference RFID tag provides to the reader the information that it is located in the marker field.

With the placement of the reference RFID tag in the marker field, two advantages are thus achieved. First, the complete infrastructure of the RFID system is monitored and checked and second, it is checked whether or not the marker field is still present in a functioning state. The infrastructure monitored therefore includes not only the airborne radio communication links, but also the functionality of the antennas, of the cable connections, and of the hardware and software configuration of the control center and all the associated components.

The subject matter of the present invention derives not only from the subject matter of the individual claims but also from the individual claims taken in combination.

All of the details and features disclosed in the documents, including in the Abstract, and in particular the physical embodiment illustrated in the drawings, are claimed as essential to the invention in so far as they are novel, whether separately or in combination, with respect to the prior art.

BRIEF DESCRIPTION OF THE DRAWINGS

The invention will now be described in detail with reference to a drawing illustrating one way of carrying out the invention. Further features essential to the invention and advantages of the invention will be apparent from the drawing and from its description.

FIG. 2 is a flowchart of the method according to one embodiment of the invention.

DETAILED DESCRIPTION

Figure 1:
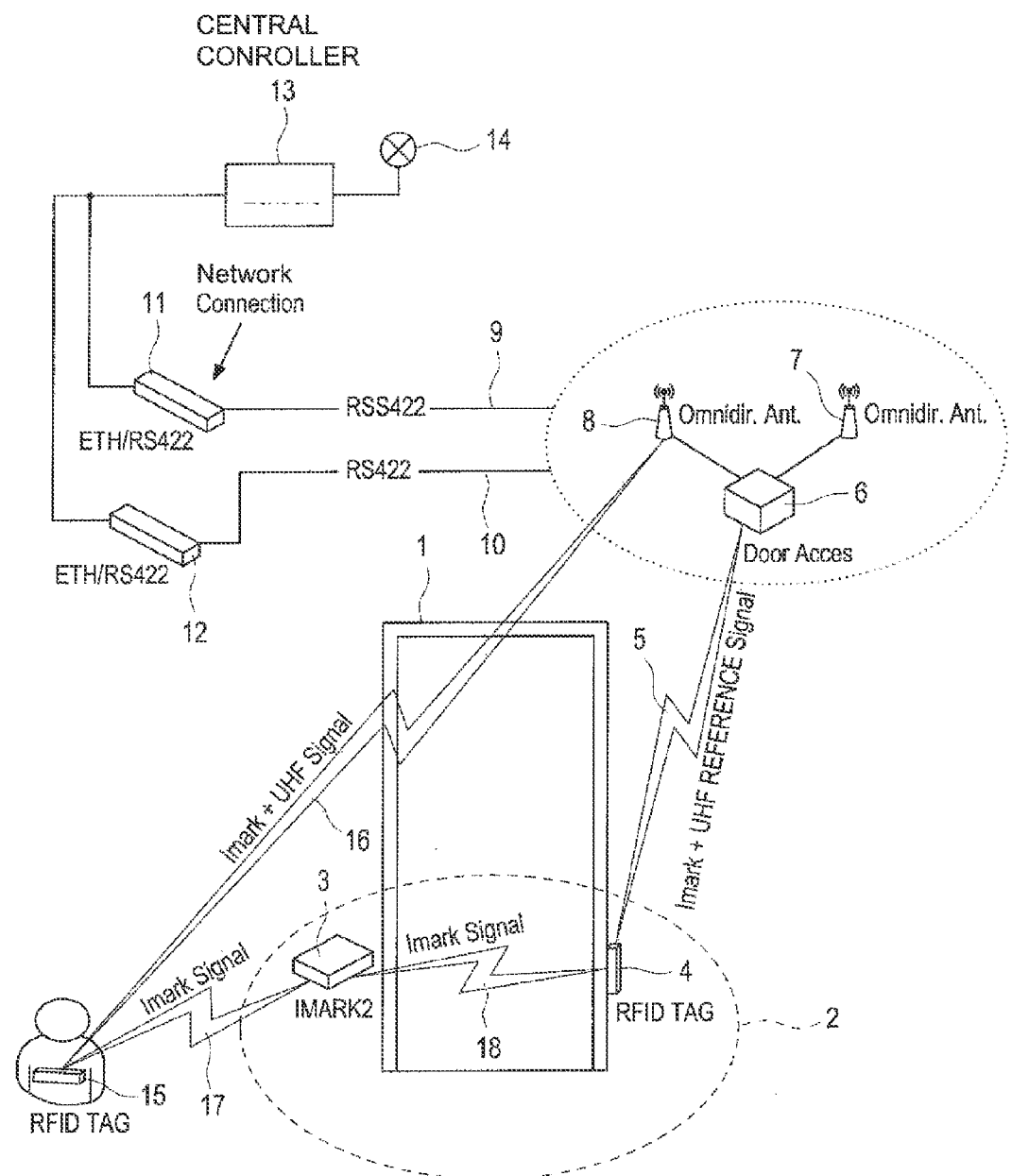
FIG. 1 illustrates an exemplary configuration of a network in which the disclosed subject matter can be implemented.

FIG. 1 shows an embodiment of the invention in which it can be seen that, for example in the region of an access 1, which may be in the form of a door or a gate or other physical element, a marker field 2 is generated—preferably by induction—which is generated by a marker 3.

The marker 3 generates therefore a spatially narrowly delimited electromagnetic field, and located inside and outside this field, spread out over a spatially extensive area and at unspecified distances to a reader 6, are a plurality of RFID tags 15 that are affixed, for example, to people in the area.

Such a configuration may be provided, for example, on a ship, in a spatially extensive industrial area, or in similar geographical environments.

The reader 6 is connected to a plurality of antennas 7, 8, although it is adequate if only one antenna 7 or 8 is provided.

The reader 6 is connected via wireless communication or via wired cables 9, 10 to associated network components 11, 12, which are preferably designed as interfaces, which are in turn connected to a control center 13 at which an alarm emitter 14 is arranged.

It is important that according to the invention at least one so-called reference RFID tag 4 is arranged approximately in the middle area of the RFID field, which only has the task of acting as a reference and which continually—or preferably intermittently—establishes with the reader 6, a radio contact or radio communication 5, which is checked.

In a preferred embodiment of the invention, not only the identity of the RFID tag 4 is transmitted, but the marker signal (I-Mark) which is transmitted from the marker 3 via a radio communication 18 as an I-Mark signal to the RFID tag 4 is an additional component of the radio communication 5.

The control center 13 checks the transmission of the UHF reference signal sent from the reference RFID tag 4 to the reader 6 and, in this way, checks the functionality of the entire RFID system in a spatially extensive local area. In addition, the control unit 13 also checks the functioning of the marker 3. The marker 3 sends, via its radio communication with the reference RFID tag 4, the I-Mark signal 18 to the reference RFID tag 4 which, in turn, transmits both data blocks (I-Mark and UHF reference signal) via the radio communication 5 to the reader 6.

Thus, the I-Mark signal 18 is transmitted together with the UHF reference signal of the reference RFID tag 4 via the radio communication 5 to the reader 6.

Any number of RFID tags 15 are present, which are, for example, designed to be mobile and can be affixed, for example, to a person. Here, too, a radio communication 16 is established from each RFID tag 15 to the reader 6, it being possible, if required, to transmit the I-Mark signal along in this radio communication 16 as well. This is effected in such a way that the marker 3 transmits via a radio communication 17, the I-Mark signal 18 to the mobile RFID tag 15. This has the effect that a decision is transmitted to the reader 6 via the radio communication 16 that indicates whether the mobile RFID tag 15 is located inside or outside the marker field 2 or, for example, has just traversed the marker field 2.

Accordingly, it is provided here as well that the mobile RFID tag 15 receives an I-Mark signal 18 from the marker field 2 and routes this I-Mark signal 18 via the communication 16 to the reader.

The reference RFID tag 4 thus also serves for checking the functioning of the marker 3. By interpreting the data of the reference RFID tag 4 in the control center 13, the functioning of all the antennas 7, 8, the functioning of the reader 6 and of course the functioning of the cable lines 9, 10 and of the network components 11, 12, and of the components of the control center 13 are checked.

All of the aforementioned embodiments also apply to Wi-Fi, UWB, GSM, SATCOM tags or similar identifications. It is important in the context of the invention that protection is provided for an association in any of the aforementioned systems between a reference tag and a system management, irrespective of the fact that the system described herein has been referred to, by way of example, as an RFID system.

FIG. 2 is a flowchart of the method according to one embodiment of the invention. According to the functioning of an RFID-based radio communication network in a spatially extensive area is monitored to determine when and where outages occur. The system includes a plurality of RFID tags which carry out radio communications with a reader, There is also at least one fixed reference RFID tag 15 in the area of coverage of the RFID system, and periodic radio communications are carried out between the at least one fixed reference RFID tag and the reader (102). The data related to the radio communication (e.g., signal strength of the received communication) is sent from the reader to a control center (104). The received data may be stored in the control center (106). In the control center, the received data is compared with previously transmitted data relating to the at least one reference RFID tag (108).

The reference RFID tag transmits at least the following data to the control center: 1. the ID of the reference tag, 2. the time of the radio communication, and 3. the residual life of the battery used, provided that batteries are used. The reference RFID tag may additionally be arranged in a marker field of a marker device that generates a spatially delimited electromagnetic field in a specific geographically delimited area of the area of coverage of the RFID system. The data stored in the control center relating to the radio communication with the reference RFID tag is field strength data indicating a field strength of the received radio communication, and the field strength data for each communication is compared with previously received field strength data.

The reference RFID tag may be operated in a power saving mode that is interrupted only for periodically establishing the radio communication with the reader.

In one embodiment, the reference RFID tag may send data relating to field strength of a marker field to the control center. In the area of the RFID field at least one reference RFID tag is arranged which periodically establishes, as a reference, with the reader a wireless communication, which is checked against previous wireless communications between the at least one RFID tag and the reader.

The control center, using the data from the reference RFID tag, checks the continuous functioning of the entire RFID system in a spatially extensive local area, and also the functioning of the marker which transmits via a radio communication a I-Mark signal to the reference RFID tag, which transmits data relating to a UHF reference signal and the I-Mark signal to the control center. In particular, the control center, in response to the comparison of the received data with the previously transmitted data, checks functioning of at least one antenna, the reader, at least one cable line, and at least one network component, and at least one component of the control center (110).

DRAWING LEGEND

1 Access
2 Marker field
3 Marker
4 Reference RFID tag
5 Radio communication
6 Reader (interrogator)
7 Antenna
8 Antenna
9 Cable line
10 Cable line
11 Network component
12 Network component
13 Control center
14 Alarm emitter
15 RFID tag
16 Radio communication
17 Radio communication
18 I-Mark signal

What is claimed is:

1. A method for monitoring the functioning of an RFID-based radio communication network in a spatially extensive area, wherein a plurality of RFID tags carry out a radio communication with a reader, comprising:
   carrying out, in the area of coverage of the RFID system in which at least one fixed reference RFID tag is arranged, a periodic radio communication between the at least one fixed reference RFID tag and the reader;
   sending the data from the reader to a control center;
   comparing the data in the control center with previously transmitted data relating to the at least one reference RFID tag;
   arranging the reference RFID tag in a marker field of a marker device that generates a spatially delimited electromagnetic field in a specific geographically delimited area of the area of coverage of the RFID system, and
   wherein the data stored in the control center relating to the radio communication with the reference RFID tag is field strength data indicating a field strength of the received radio communication, and the field strength data for each communication is compared with previously received field strength data.

2. The method according to claim 1, wherein the reference RFID tag transmits at least the following data to the control center:
   the ID of the reference tag,
   the time of the radio communication, and
   when batteries are used, the residual life of the battery used.

3. The method according to claim 1, further comprising operating the reference RFID tag in a power saving mode that is interrupted only for periodically establishing the radio communication with the reader.

4. The method according to claim 1, further comprising transmitting, by the reference RFID tag to the control center, data relating to field strength of a marker field.

5. The method according to claim 1, wherein in the area of the RFID field at least one reference RFID tag is arranged which periodically establishes, as a reference, with the reader a wireless communication, which is checked against previous wireless communications between the at least one RFID tag and the reader.

6. The method according to claim 1, wherein the control center, using the data received from the reference RFID tag, checks the continuous functioning of the entire RFID system in a spatially extensive local area, and also the functioning of the marker which transmits via a radio communication a I-Mark signal to the reference RFID tag, which transmits data relating to a UHF reference signal and the I-Mark signal to the control center.

7. The method according to claim 1, wherein the control center, in response to the comparison of the received data with the previously transmitted data, checks functioning of at least one antenna, the reader, at least one cable line, and at least one network component, and at least one component of the control center.

8. An apparatus for monitoring the functioning of an RFID-based radio communication network in a spatially extensive area, comprising:
- a reader,
- a control unit,
- a plurality of RFID tags carrying out radio communications with the reader, and
- at least one fixed reference RFID tag in the area of coverage of the RFID system that performs a periodic radio communication with the reader, and sends data relating to the periodic radio communication to the control center, wherein the control center compares the received data with previously transmitted data;

wherein the reference RFID tag is arranged in a marker field of a marker device that generates a spatially delimited electromagnetic field in a specific geographically delimited area of the area of coverage of the RFID system, and wherein the data stored in the control center relating to the radio communication with the reference RFID tag is field strength data indicating a field strength of the received radio communication, and the field strength data for each communication is compared with previously received field strength data.

9. The apparatus according to claim 8, wherein the control center, in response to the comparison of the received data with the previously transmitted data, checks functioning of at least one antenna, the reader, at least one cable line, and at least one network component, and at least one component of the control center.

* * * * *